(No Model.)
J. H. F. GÖRGES.
ROTARY CURRENT MOTOR.
No. 510,534. Patented Dec. 12, 1893.
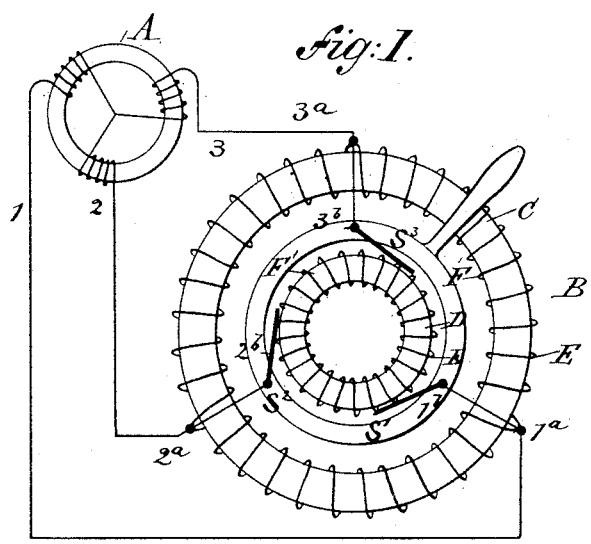
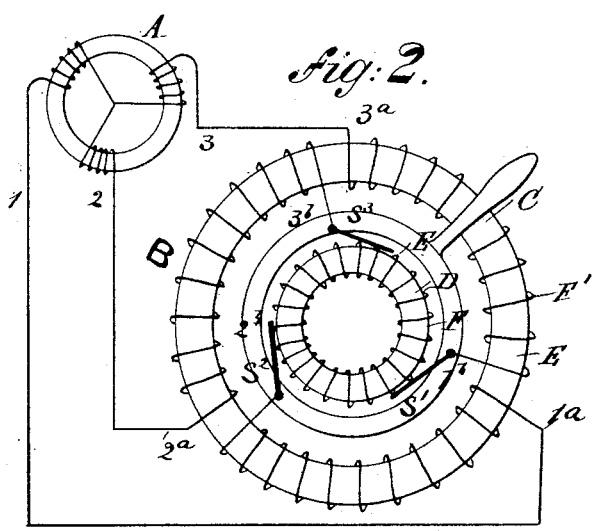
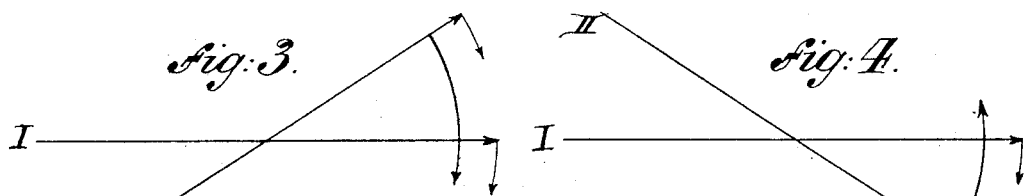
WITNESSES:
A. Schehl.
T. M. Rowlette
INVENTOR
Johannes Heinrich Friedrich Görges
BY
Geo. H. Benjamin
ATTORNEY.

United States Patent Office.

JOHANNES HEINRICH FRIEDRICH GÖRGES, OF BERLIN, GERMANY, ASSIGNOR TO SIEMENS & HALSKE, OF SAME PLACE.

ROTARY-CURRENT MOTOR.

SPECIFICATION forming part of Letters Patent No. 510,534, dated December 12, 1893.

Application filed April 30, 1891. Serial No. 391,156. (No model.) Patented in Germany January 21, 1891, No. 61,951; in Austria-Hungary March 26, 1891, No. 49,939/42,467 and No. 81,789/26,290, and in France March 31, 1891, No. 214,477.

*To all whom it may concern:*

Be it known that I, JOHANNES HEINRICH FRIEDRICH GÖRGES, a subject of the Emperor of Germany, and a resident of Berlin, in the Empire of Germany, have invented certain new and useful Improvements in Electric Motors, (for which I have obtained Letters Patent in Germany, No. 61,951, dated January 21, 1891; in France, No. 214,477, dated March 31, 1891, and in Austria-Hungary, No. 49,939/42,467 and No. 81,789/26,290, dated March 26, 1891,) of which the following is a specification.

My invention relates to electric motors of the type which are designed to be energized by a multiphase or rotary current,—*i. e.* an alternating current divided into three or more successive phases, or currents of equal periods and amplitude. As heretofore constructed electro motors employing such currents have usually had either the fixed or rotating portion of the motor in circuit with the source of energy; the part not in circuit being excited either from an independent source of electricity or by induction from the part of the motor which is in circuit with the source of energy. Or in case where both the fixed and rotating portions of the motor were in circuit with the source of energy, the connection and relation of the parts were such that the magnetic fields created rotated in opposite directions.

My invention consists in so constructing an electro-motor of the type described, that both the fixed and rotating portions of the motor are in circuit with the source of energy, and the parts so related and connected that the magnetic fields created shall be approximately of equal strength and will rotate in the same direction, whereby the motor may be readily started from a condition of rest, and its useful out-put or energy materially increased.

My invention further relates to the means employed for reversing the direction of motion of the motor, without altering connections of the motor with the source of energy, and also for regulating the energy exhibited by the motor, without varying the energy at the source from which the current is derived.

In the specification, I will describe a motor energized by a current having three successive phases, or currents of equal period and amplitude. It will be understood, however, that the number of currents which may be employed is optional, but must always be greater than two.

In the accompanying drawings which illustrate my invention, similar letters and figures of reference indicate like parts.

Figure 1 is a diagram showing an electro motor constructed according to my invention, and designed to be energized by an alternate current divided into three successive phases or currents of equal period and amplitude. In this figure the fixed and rotating members of the motor are shown as connected together in multiple. Fig. 2 is a similar diagram showing the fixed and rotating members connected in series. Figs. 3 and 4 are diagrams which illustrate the relation of the rotating magnetic axes of the fixed and rotating portions of the motor and the position which they occupy relatively to each other when the rotating portion of the motor is rotated in opposite directions.

In Figs. 1 and 2, means consisting of contact brushes, a sector and a handle, is shown, whereby the direction of the motor may be reversed and the torque of the motor increased or decreased at will.

In the drawings, A indicates a generator of multiphase currents. In the present instance, the generator is designed for a current of three successive phases, or currents of equal period and amplitude.

B, Figs. 1 and 2, indicates an electro motor constructed according to my invention. The electro motor is shown as connected to the generator A, by conductors 1, 2, 3, which correspond in number with the phases of the current or separate currents transmitted from the generator A.

The motor B, consists of the member C and the member D. Either of these members may be arranged to rotate,—the other member being stationary,—since in this case, as that of other motors, the relative motion of the parts is the essential point.

For the purposes of description, we will consider that the member C is fixed and the member D adapted to rotate. Both the members C and D are shown as formed in the manner of a "Gramme-ring;" that is, they are provided with an iron core E over which is wound a continuous and endless insulated conductor F or F'. In Fig. 2, the conductor F' is wound upon the core E as independent sections. The three conductors 1, 2, 3, from the generator A convey three successive phases of an alternate current, or three alternate currents, the periods of which are equal and of the same amplitude, so that their total sum amounts to naught. These three conductors are connected to the fixed member C of the motor at the points $1^a$, $2^a$, $3^a$, distant from each other by one-third the circumference of the ring.

In Fig. 1, the conductors, after being connected to the motor, are continued as conductors $1^b$, $2^b$, $3^b$, and connected to brushes $S'$, $S^2$, $S^3$.

In Fig. 2, the conductors 1, 2, 3, are wound in successive sections upon the core of the fixed member C, so that each section covers one-third of the core, and these coils end in the brushes $S'$, $S^2$, $S^3$.

The brushes $S'$, $S^2$, $S^3$, are mounted upon a sector T insulated from each other and arranged to occupy a fixed position relatively to each other, and to bear upon the exposed periphery of the rotating member D of the motor at points equally distant from each other, by one-third of the circumference. Instead of arranging the brushes to bear upon the periphery of the rotating member D, they may be located upon a commutator (not shown), which may be constructed as usual with motors furnishing direct current. The sector T is provided with a handle U, so that it may be rotated in either direction, thereby simultaneously moving all the brushes in either direction around the periphery of the motor or the commutator upon which they bear.

The operation of my improved motor is as follows: The successive currents transmitted along the conductors 1, 2, 3, are divided by reason of well-known laws between the coils of the fixed member C and the rotating member D of the motor, and induce separate magnetic axes in these two members, which occupy a certain and definite position relative to each other and the vertical axes of the motor as a whole. As impulse No. 1, transmitted along conductor 1 dies down, and the impulse transmitted along the conductor 2 rises to its maximum, the magnetic axes of the two parts are progressively rotated to a new position relative to the vertical axes in the motor. This motion is repeated as the current transmitted along the conductor 2 dies down, and the current transmitted along conductor 3 reaches its maximum, so that as the currents are transmitted successively along the conductors 1, 2, 3, the magnetic axes are similarly moved. It will be evident that if the magnetic axes of the fixed and rotating members occupy the same relation to the vertical axes of the motor, or in other words, cover each other, there will be no momentum of torsion in either direction, and hence no motion of the rotating member; but if the brushes $S'$, $S^2$, $S^3$, are so located as to produce a magnetic axis in the rotating member, either in front of or behind the magnetic axes produced in the fixed member, a couple of forces will be present, which will tend to force the axes to cover each other and thus induce rotary motion.

In order to more fully illustrate the action of the two rotating axes, reference is had to the drawings, Figs. 3 and 4. The radial arrow I, represents the rotating axis as produced in the fixed member of the motor. The radial arrow II represents the rotating axis as produced in the rotating member of the motor. The small arrows tangentially attached, indicate the direction of the rotation of the two magnetic axes, which direction exclusively depends on the polarity of the conductors 1, 2, 3, and their connection with the points $1^a$, $2^a$, $3^a$, of the fixed member of the motor. The direction of rotation of both of the rotating magnetic axes is always the same, and is entirely independent of the mechanical rotation of the rotating member. This latter is indicated in the drawings, Figs. 3 and 4, by the large arrow tangentially arranged. If the connections from the generator to the motor are such that the rotating axes of the fixed member of the motor are in advance of the rotating axes of the rotating member of the motor, the direction of the mechanical rotation of the rotating member of the motor will be the same as that of the magnetic rotation as shown in Fig. 3. If, on the other hand, the rotating axes of the rotating member are in advance of the rotating axes of the fixed member, the direction of the mechanical rotation of the rotating member will be opposite to that of the magnetic rotation as shown in Fig. 4. It will be evident that the rotating couple of forces will depend upon the intensity of the two magnetic axes and the angle which they include; and this will determine the power and velocity exhibited by the motor. The velocity of the mechanical rotation, however, will be entirely independent of the velocity of the magnetic rotation.

The direction of rotation of the motor, as well as the energy exhibited by the motor may be varied as will be understood by the foregoing description, by (assuming the current transmitted to be constant) varying the position of the brushes on the periphery or commutator of the rotary member, relatively to the points of introduction of the current from the source of energy into the fixed portion of the motor.

If it is desired to change the direction of motion of the rotating member the sector T is rotated thereby altering the position of the brushes, and changing the position of the rotating magnetic axis of the rotating member, from a position in advance, to a position behind that of the rotating magnetic axis of the fixed member, or vice versa.

If it is desired to increase or decrease the pull or torque of the motor, the sector is rotated to move the brushes in one direction or the other and thereby increase or decrease the angle included between the rotating magnetic axes of the fixed and rotating members.

In describing the construction of the motor, I have stated that the fixed and rotating members were made in the manner of Gramme-rings. Instead of using this construction, I may use the construction known as the Siemens drum; and also various other constructions and systems may be employed as will be evident to those skilled in the art to which this invention belongs.

I wish it understood that I do not limit myself to the number of phases of an alternate current, or alternating currents which may be employed to energize a motor of the construction described in this application, nor to the number of magnetic axes produced in the fixed and rotating members of my improved motor, nor to the shape or construction of the fixed and rotating members of the motor, nor to the arrangement of the coils thereon, provided such construction as a whole embodies the invention set forth in this application.

Having thus fully described my invention, I claim—

1. In an electro-motor adapted to be energized by multiphase currents of successive phase, equal period and amplitude, the combination of a fixed member, a rotating member, and means whereby the successive current impulses transmitted to the motor are divided between the fixed and rotating members thereof, and the magnetic axes produced therein progressively shifted in the same direction.

2. In an electro-motor adapted to be energized by multiphase currents of successive phase, equal period and amplitude, the combination of a fixed member, a rotating member, and means consisting of brushes corresponding in number with the successive impulses transmitted to the motor, whereby the said impulses are divided between the fixed and rotating members.

3. In an electro-motor adapted to be energized by multiphase currents of successive phase, equal period and amplitude, the combination of a fixed member and a rotating member, each comprising an iron core and a coil or coils thereon, said coil or coils divided into three or more uniform parts, or sections, and brushes corresponding in number with the division of the coils and communicating between the coils on the fixed and rotating members of said motor.

4. In an electro-motor adapted to be energized by multiphase currents of successive phase, equal period and amplitude, the combination of a fixed member comprising an iron core and a coil or coils thereon, a rotating member comprising an iron core and a closed coil thereon, and brushes corresponding in number with the separate impulses transmitted to the motor, and communicating between the coils on the fixed member of the motor and that on the rotating member of said motor.

5. In an electro-motor adapted to be energized by multiphase currents, and in which the successive current impulses produce a progressive shifting of the magnetic axes of both the fixed and rotating members of said motor in the same direction, the combination with said fixed and rotating members, of means substantially as described, whereby the angle included between said magnetic axes may be varied, and the effective energy of the motor increased or diminished as desired, without varying the strength of the current impulses transmitted to the motor.

6. An electro-motor comprising a closed circuited fixed member, and a closed circuited rotatable member, and said members connected together in circuit by means of three or more brushes, and suitable connections, so located as to divide the coils on both members into three or more uniform parts or sections.

7. The combination with a motor having separate and independent circuits on the fixed and rotating members thereof, of a multiphase alternating current generator adapted to generate three or more successive current phases, or currents of equal period and amplitude, three or more conductors leading from said generator, and electrically connected to corresponding circuits on the fixed and rotating members of said motor, whereby a progressive shifting of the magnetic axes of both members of said motor in the same direction is produced, and rotation effected.

8. In an electro-motor adapted to be energized by multiphase currents, and in which the successive current impulses produce a progressive shifting of the magnetic axes of both the fixed and rotating members of said motor in the same direction, of means substantially as described, whereby the direction of rotation of said rotating members may be caused to be opposite to that of said magnetic axes.

9. In a system of electric power distribution, in combination with a multiphase current generator, of conductors leading therefrom corresponding in number to the separate phases or currents produced by said generator, and an electro-motor having the coils upon its fixed and rotating members in circuit with said conductors.

10. The method herein described of electrically transmitting power, which consists in generating three or more successive current phases or currents of equal period and amplitude, successively developing in the fixed and rotating members of an electro-motor independent magnetic axes which occupy different planes and are progressively shifted around the coils of said motor without altering their angular relation, whereby rotary motion of the rotating member of the motor is produced.

11. A multiphase motor having a number of field coils acting in different directions, and energized by alternating currents of different phase to produce a rotating field, and an armature in said field having a number of coil portions acting in different directions, and energized by multiphase currents so as to produce a rotating armature polarity, the connections and windings being such that the two polarities are non-coincident, but rotate in the same direction.

In testimony whereof I have affixed my signature in presence of two witnesses.

JOHANNES HEINRICH FRIEDRICH GÖRGES.

Witnesses:
  ALORD DeBOIS REYMOND,
  MAX WAGNER.